United States Patent [19]

Miller et al.

[11] Patent Number: 4,902,323

[45] Date of Patent: Feb. 20, 1990

[54] METHOD OF MAKING FIBER OPTIC COUPLER

[75] Inventors: William J. Miller; Eric H. Urruti, both of Corning, N.Y.

[73] Assignee: Corning Incorporated, Corning, N.Y.

[21] Appl. No.: 261,693

[22] Filed: Oct. 24, 1988

[51] Int. Cl.$^4$ .............. C03C 25/02; C03B 23/207; C03B 37/027

[52] U.S. Cl. ..................... 65/3.11; 65/4.21; 65/4.3; 350/96.15

[58] Field of Search ............ 65/3.11, 3.2, 4.2, 4.21, 65/4.3, 109, 110; 350/96.15

[56] References Cited

U.S. PATENT DOCUMENTS

| | | | |
|---|---|---|---|
| 3,579,316 | 5/1971 | Dyott et al. | 65/4.21 |
| 4,291,940 | 6/1977 | Kawasaki et al. | 65/4.2 |
| 4,377,403 | 3/1983 | McLandrich | 65/3.11 |
| 4,392,712 | 7/1983 | Ozeki | 350/96.15 |
| 4,410,346 | 10/1983 | Aulich et al. | 65/4.2 |
| 4,426,215 | 1/1984 | Murphy | 65/4.21 |
| 4,439,221 | 3/1984 | Smyth et al. | 65/4.21 |
| 4,449,781 | 5/1984 | Lightstone et al. | 350/96.16 |
| 4,490,163 | 12/1984 | Jochem et al. | 65/4.2 |
| 4,591,372 | 5/1986 | Bricheno et al. | 65/4.2 |
| 4,726,643 | 2/1988 | Imoto et al. | 350/96.21 |

FOREIGN PATENT DOCUMENTS

59-195615 11/1984 Japan ................. 65/3.11
60-140208 7/1985 Japan .

*Primary Examiner*—Kenneth M. Schor
*Assistant Examiner*—John J. Bruckner
*Attorney, Agent, or Firm*—William J. Simmons, Jr.

[57] ABSTRACT

A fiber optic coupler is formed as follows. Glass optical fibers, each having a core, cladding and coating are disposed within the longitudinal aperture of a capillary tube, the fibers extending beyond each end thereof. The fibers are preferably held taut to effect a tension therein. The coating is removed from that portion of the fibers in the midregion of the tube by oxidation, depolymerization or the like. The coating remains on those portions of the fibers extending into the ends of the apertures to precisely orient the fibers within the tube. The midregion of the tube is heated, collapsed about the fibers, and drawn to reduce the diameter thereof.

14 Claims, 3 Drawing Sheets

METHOD OF MAKING FIBER OPTIC COUPLER

CROSS-REFERENCE TO RELATED APPLICATION

This application is related to the following U.S. patent applications: Ser. No. 204,620 entitled "Method of Making an Economical Fiber Coupler" By G. E. Berkey, filed June 9, 1988, which is a continuation-in-part application of Ser. No. 82,678 filed Aug. 7, 1987 and now abandoned; and Ser. No. 223,423 entitled "Method of Reproducibly Making Fiber Optic Coupler" by W. J. Miller et al. filed July 25, 1988.

BACKGROUND OF THE INVENTION

The present invention relates to a method of making fiber optic couplers, and more particularly, to a low cost method of making such couplers so that the optical characteristics thereof closely conform to predetermined specifications.

It has been known that coupling occurs between two closely spaced cores in a multiple core device. The coupling efficiency increases with decreasing core separation and, in the case of single-mode cores, with decreasing core diameter. Couplers based on these principles are capable of low loss operation, i.e. they exhibit an excess loss of about 1 dB or less.

Reproducible methods of making rugged optical fiber couplers are disclosed in the aforementioned related application Ser. Nos. 204,620 and 223,423. Two suitably prepared glass fibers, each having a core and cladding, are disposed within the longitudinal aperture of a glass capillary tube, the fibers extending beyond each end thereof. The midregion of the tube is heated and collapsed about the fibers to form a solid midregion, and a portion of the collapsed midregion is stretched to reduce the diameter thereof. The optical fibers used to form the coupler are conventionally provided with a plastic coating to increase the strength thereof. The preparation of the optical fibers has involved mechanically stripping the coating from the surface of that portion of the fiber which was to be positioned at the midregion of the tube. That prior method has been proven to be successful in the formation of couplers which have a minimal number of seeds and which therefore exhibit good optical properties such as low attenuation and predictable coupling characteristics. However, the step of mechanically stripping the coating from the fibers is time consuming and involves the handling of the fragile, uncoated fibers. Solvent stripping methods also require an inordinate amount of fiber handling.

SUMMARY OF THE INVENTION

It is therefore an object of the present invention to provide a method that overcomes the disadvantages of the prior art. Another object is to provide a method which requires less handling of optical fibers and is therefore more cost effective. A further object is to provide a method of making optical couplers, the optical properties of which closely conform to predetermined values. A further object is to provide a method of making optical couplers that are capable of withstanding environmental abuses such as temperature changes and mechanical influences and yet effect a reliable and predictable transfer of energy between adjacent fibers.

Briefly, the present invention relates to a method of making a fiber optic coupler. There is provided a glass tube having a longitudinal aperture extending therethrough. At least two glass optical fibers, each comprising a core, a cladding, and a protective coating, are disposed within the longitudinal aperture. At least one end of each of the fibers extends beyond an end of the tube. At least a portion of the coating is removed from that part of each fiber that is situated within the aperture. The portion of the fibers from which the coating is removed is preferably that portion that is located within the aperture except for those coating regions adjacent the ends of the aperture. The midregion of the tube is collapsed around the fibers, and at least a portion of the midregion is drawn to reduce the diameter thereof and to reduce the spacing between the fiber cores.

The step of removing may comprises heating the coating to a temperature sufficiently high to cause it to burn out, i.e. decompose, oxidize, depolymerize or the like. The atmosphere to which the coatings are subjected during removal, which can be oxidizing, inert, reducing, vacuum, or the like, depends upon factors such as the type and thickness of coating material employed. The coating may be subjected to heat by directing a flame or comparable heat source toward the lateral surface of the tube near the first end thereof and traversing the source toward the second end thereof. Alternatively, the step of heating the coating may comprise inserting the tube into a furnace whereby at least that portion thereof along which the coatings are to be removed is subjected to an elevated temperature.

Prior to inserting the fibers into the tube, at least a portion of the coatings can be stripped therefrom, the lengths of the fibers from which coatings have been stripped being shorter than the length of the aperture. The uncoated portions of the fibers are then disposed within the longitudinal aperture such that the coated portions of the fibers contact the end regions of the aperture and are thereby precisely positioned by the aperture. The step of heating removes any trace of coating material from the stripped regions of the fibers and from the surface of the aperture.

The step of heating to collapse and stretch may comprise heating the central portion of the tube to at least the softening point of the material thereof to collapse the central portion around the fibers, thereby forming a solid midregion, and thereafter heating at least a portion of the solid midregion to at least the softening points of the materials of the glass fibers and the tube and drawing at least a portion of the midregion.

In an alternative embodiment, the steps of collapsing the tube onto the fibers and drawing or stretching the midregion of the tube are performed in a single heating operation.

DESCRIPTION OF THE PREFERRED EMBODIMENTS

The drawings are not intended to indicate scale or relative proportions of the elements shown therein.

The present invention relates to an improved method of making optical fiber couplers by disposing within the longitudinal aperture of a glass tube at least two glass optical fibers, each comprising a core, cladding and protective coating. A portion of the coating intermediate the ends thereof is removed, the uncoated portion of the fibers being disposed within the aperture. The fibers are held taut to effect a tension therein, and they are preferably glued to the ends of the tube so that they remain in tension during further processing steps. Thereafter, the midregion of the assembly so formed is heated to cause it to collapse around the fibers, and it is stretched or drawn to reduce the diameter thereof and to cause the spacing between the fiber cores to decrease, whereby optical power can be coupled between the cores.

For a coupler manufacturing process to consistently produce couplers having predetermined optical characteristics, all of the process steps, including the step of inserting the fibers into the capillary tube should be uniformly performed on each coupler made. Furthermore, it is noted that for certain types of coupling devices, such as WDM couplers and polarization retaining couplers, the fibers must be kept untwisted and must be maintained parallel to one another. To keep the fibers untwisted and straight, the apparatus which holds the fibers should be properly aligned.

Figure 1:
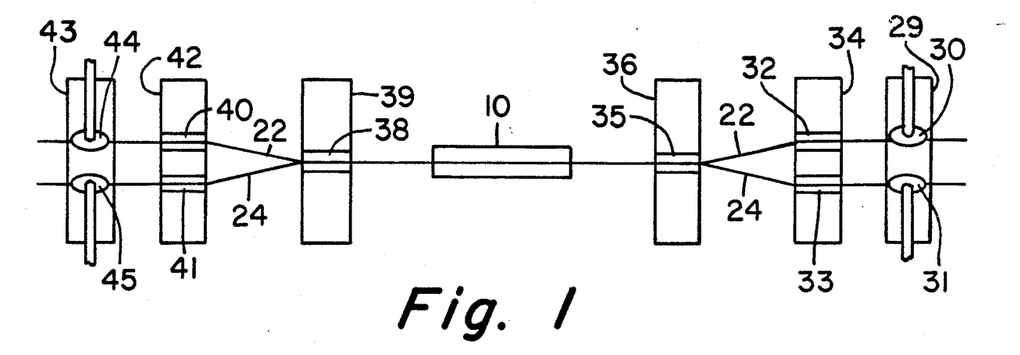
FIG. 1 is a schematic illustration of an apparatus for inserting fibers into the tube.

It is therefore advantageous to employ a fiber insertion station of the type illustrated in FIG. 1 which comprises aligned blocks 29, 34, 36, 39, 42 and 43. Rubber surfaced clamps 30 and 31 are capable of retaining optical fibers against block 29. Similar clamps 44 and 45 are associated with block 43. The clamps, which are spring biased against the blocks, can be withdrawn from contact with the blocks by depressing a handle connected thereto. Block 34 contains spaced grooves 32 and 33 that are aligned with grooves 40 and 41 of block 42. A single groove 35 in the surface of block 36 is aligned with similar groove 38 of block 39. The illustrated grooves may be U-shaped and may have a width that is just sufficient to slidingly accommodate the fiber or fibers that are situated therein.

Preferred for use in the method of the present invention is tube 10 (see FIG. 2) having a longitudinal aperture 12. Tube 10 may comprise a capillary tube formed as hereinafter described in detail or as taught in copending U.S. patent application entitled "Capillary Splice and Method", Ser. No. 082,680 (Berkey 9), filed on Aug. 7, 1987, which application is incorporated herein by reference. Tapered apertures 14 and 16 form funnel-like entrances to longitudinal aperture 12 at end surfaces 18 and 20, respectively. The tapered apertures facilitate the insertion of fibers into aperture 12, the maximum cross-sectional dimension of which may be less than 400 μm. Tapered apertures 14 and 16 also facilitate the application of glue to the fibers in such a manner that the aperture is not blocked thereby.

The softening point temperature of tube 10 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. A preferred composition is borosilicate glass comprising $SiO_2$ doped with 8–10 wt. % $B_2O_3$. In addition to lowering the softening point temperature of $SiO_2$, $B_2O_3$ and F also advantageously decrease the refractive index thereof.

Figure 2:
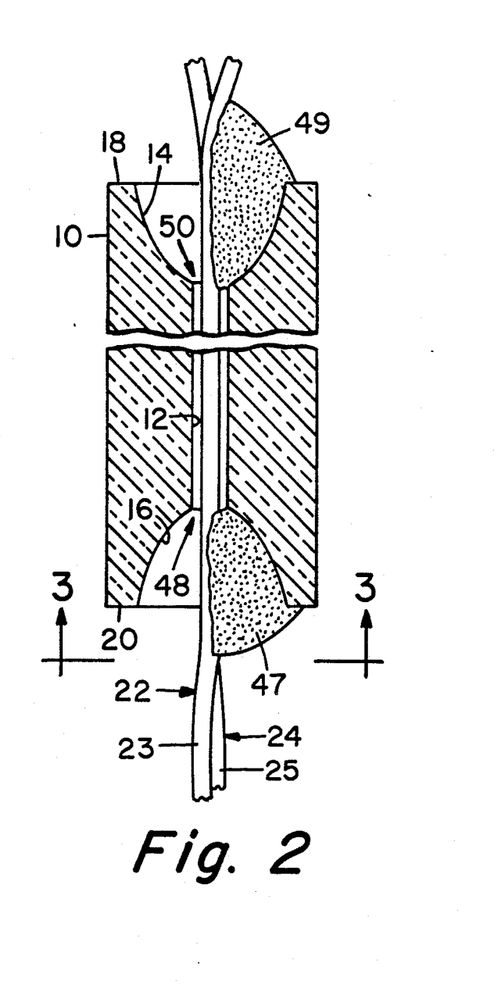
FIG. 2 is a cross-sectional view of a tube having coated fibers glued thereto.
Figure 3:
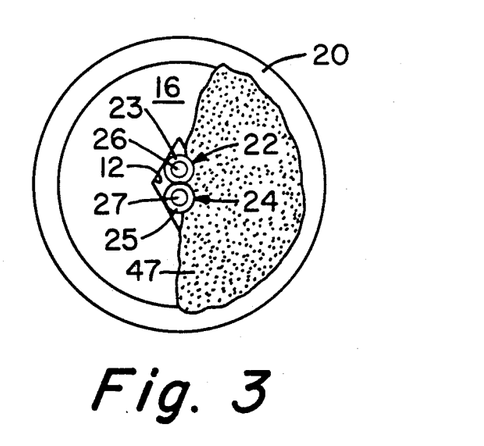
FIG. 3 is a cross-sectional view taken along lines 3—3 of FIG. 2.

The operation of the fiber insertion station of FIG. 1 is as follows, reference also being made to FIGS. 2 and 3. Two lengths 22 and 24 of coated optical fiber are severed from a reel of fiber. Coated fibers 22 and 24 comprise glass optical fibers 26 and 27, respectively, which are provided with protective coatings 23 and 25, the characteristics of which are discussed below. Optical fibers 26 and 27 conventionally comprise a glass core and a layer of cladding glass having a refractive index lower than that of the glass core. The lengths of coated fibers 22 and 24 should be sufficient to enable each fiber to extend beyond both ends of the tube a sufficient distance to make connection thereto, a total fiber length of 2 meters having been found to be sufficient. The coated fibers may be wiped with a lintless cloth dampened with a suitable cleaning solution such as ethyl alcohol.

An end of each of the coated fibers 22 and 24 is secured by clamps 30 and 31, respectively. The capillary tube is threaded onto the coated fibers and moved to a position intermediate blocks 36 and 39. In order to facilitate the movement of the tube along the fibers, a small amount of ethyl alcohol may be squirted into the tube. This functions as a temporary lubricant which will readily evaporate.

The aperture of capillary tube 10 is preferably just large enough to accept the coated portions of the optical fibers. Such a relationship between the coated fibers and the aperture prevents the ends of the fibers from twisting within the tube. Certain hole cross-sectional shapes such as diamond, square and the like facilitate the proper alignment of the fibers in the tube. The aperture diameter can be so small that some resistance is encountered when threading the fibers therethrough. Even though this could cause the coating to smear on the inside of the tube, the present method results in the removal of such coating smears, wherefore the resultant coupler is substantially free from seeds that would degrade the coupler's performance.

Coated fibers 22 and 24 are pulled slightly so that they are under some tension, and the remaining ends thereof are then restrained by clamps 44 and 45, respectively. The fibers are then placed into grooves 35 and 38 which help to hold the fibers straight and adjacent one another.

A small amount 47 of glue is applied to one side of coated fibers 22 and 24 to attach them to one side of tapered aperture 16 while leaving an opening 48 which permits access to longitudinal aperture 12 between glue 47 and the remainder of the tapered aperture 16. A drop 49 of glue is similarly applied between the fibers and tapered aperture 14, leaving aperture access opening 50 between glue 49 and tapered aperture 14. Openings 48 and 50 permit the flow of fluid (liquid or gas) through aperture 12 during the optional final wash step and/or during coating burnout; they also permit the evacuation of aperture 12 during the collapse of tube 10. If the glue is a UV light curable epoxy, UV light is directed on the first applied drop of epoxy to cure it before the second drop is applied to the remaining end. After the second drop is applied, it is cured by UV light.

The pigtails or sections of fiber extending from the ends of tube 10 can be color coded. At this time the fibers within the capillary tube are visually checked for internal twists. A twist of more than 180° can be seen by the naked eye. Also, a laser beam can be launched into that end of coated fiber 22 protruding from clamp 44. If there is no twist present, the light emanates from that end of coated fiber 22 protruding from clamp 30. An orientation mark can be placed on the upper surface of tube 10 so that the fibers can be oriented in the same manner with respect to the draw apparatus for each coupler that is made, thereby ensuring every coupler preform is subjected to uniform process conditions.

In accordance with the present invention, at least a portion of the coating is removed from that part of each fiber that is situated within the aperture. The coating can be removed by heating it to a temperature which is sufficiently high to cause it to burn out but which is not high enough to cause the tube to soften. A heat source such as a focussed burner, an electric furnace or the like can be employed. The hot zone of the electric furnace would preferably be of sufficient length to uniformly heat only that portion of each coating that is to be removed.

Figure 4:
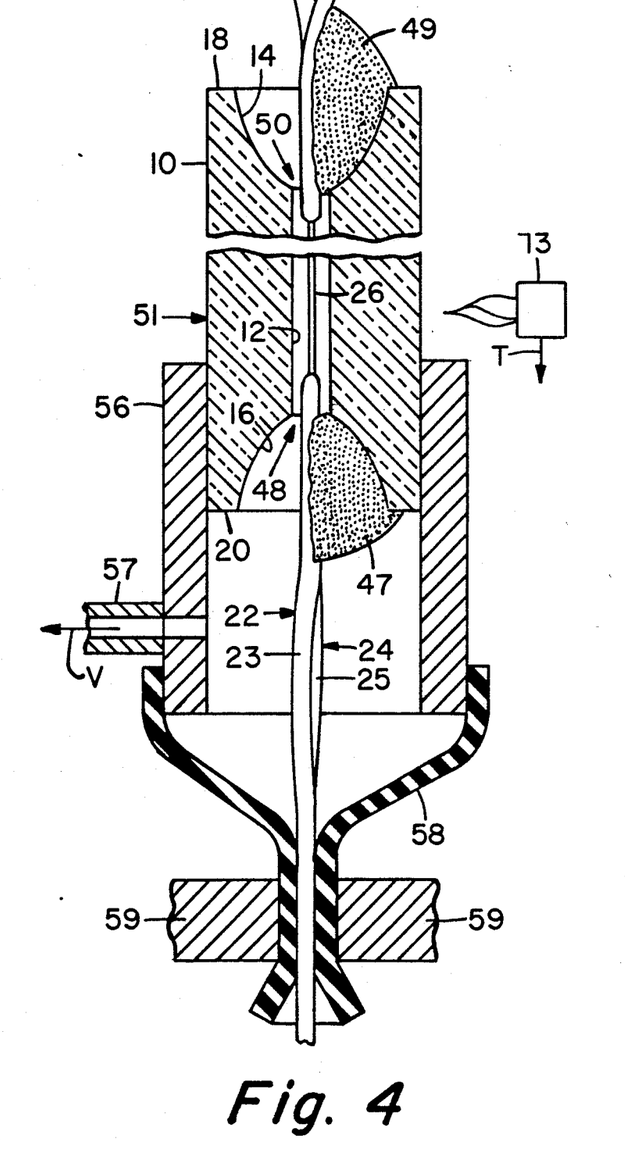
FIG. 4 is a schematic illustration of an apparatus for burning the coatings from optical fibers, and in addition, illustrates a method of evacuating the tube.

A suitable apparatus for heating the coating is schematically illustrated in FIG. 4. The composite comprising tube 10 and coated fibers 22 and 24 is removed from the fiber insertion station and is mounted vertically in an evacuation apparatus comprising a vacuum attachment 56, which may comprise a short, somewhat rigid section of rubber tube having a vacuum line 57 extending radially therefrom. One end of a length of thin rubber tubing 58 is attached to that end of vacuum attachment 56 that is opposite tube 10, the remaining end of the tubing extending between clamp jaws 59. Fibers 22 and 24 extend from tubing 58. End 18 of tube 10 can be left open to the atmosphere.

If there is a possibility that the coated fibers have any surface contaminants that could cause seeds or otherwise adversely affect the resultant coupler, a liquid cleaning solution such as ethyl alcohol may be injected into tapered aperture 14 and withdrawn through vacuum line 57. This wash can be eliminated by carefully handling the coated fibers.

As shown in FIG. 4, a narrow flame from burner 73 is initially directed onto that portion of the surface of tube 10 remote from vacuum attachment 56, and the burner is traversed in the direction of arrow T toward the vacuum attachment. Those portions of the coated fibers located longitudinally inwardly from the ends of aperture 12 are thus heated to a temperature which is above the coating decomposition temperature but below the softening point temperature of tube 10. The coating material in the immediate vicinity of the flame burns or decomposes, whereby the desired length of coating material is removed as shown in FIG. 4. If the reaction is oxidation, the oxygen is supplied by air entering the upper end of tube 10, and the reaction products are exhausted by the vacuum attachment at the lower end thereof. Other gases can be flowed into the open end of tube 10 in addition to or instead of air. An inert gas such as helium, argon or the like could be flowed along with air to lower the oxygen content. If desired, only oxygen and a diluent gas such as an inert gas could be employed. By controlling the composition of the atmosphere flowing into tube 10, the burnout atmosphere can be made to be oxidizing, reducing or inert. The tube could be evacuated during burnout by blocking the upper end of tube 10 or by employing the additional vacuum means 62–64 of FIG. 5. By varying such process parameters as burnout atmosphere and temperature, the burnout rate can be controlled. As used herein, terms such as "burnout", "burns out" or the like refers to the process of removing a portion of the fiber coating by decomposition, depolymerization, oxidation or the like.

Protective coatings 23 and 25 must possess conventional characteristics such as ability to protect the fibers from abrasion during manufacture, and they preferably burn out cleanly (without leaving a residue). Most conventional optical fiber coating materials can be employed. Possible exceptions are silicones which leave a 10–40% silica residue on decomposition. Given enough time and a high enough temperature, most organics will burn out cleanly. However, it is preferred that the coating material react to form $CO$, $CO_2$ and water at a low temperature without forming a carbon residue which could cause seeds which would result in optical defects. It is possible that even if carbon is formed, it can be eliminated by continually changing the atmosphere within the aperture to evacuate the carbon particles therefrom. However, it is preferred to select a coating material which does not give a carbon residue, thereby eliminating a potential manufacturing problem. Coating materials which produce toxic by-products are also usually avoided. Furthermore, the coating material should not leave behind trace metals (which may have been used during the material synthesis). For example, in the synthesis of urethane acrylates, dibutyl tin dilurate is used as a catalyst. Though used in small amounts, the residual heavy metal atoms could cause seed formation during tube collapse.

The preferred classes of compounds are those which decompose cleanly without having to be subjected to to excessively high temperatures, long burn out times, or pure oxygen atmospheres. Some examples of preferred materials are Torlon (TM) which is a polyimide imide, QPAC-40 (TM) which is a polyalkylene carbonate, polymethacrylates such as polymethyl methacrylate, and polyvinyl butyral.

The temperature to which the coated fibers must be heated depends upon the particular coating material employed. For example, rapid decomposition of $\alpha$-methyl styrene occurs at 60° C., but some of the high temperature polyimides decompose at a temperature in the range of 450°–650° C. In general, the above-mentioned preferred materials rapidly burn out at a temperature between 240° and 500° C. with the exception of Torlon (TM) which begins to burn out at temperatures around 600° C. It is noted that the coated fibers may be cooled by the flow of gas through the tube. Therefore, the temperature of the flame must be somewhat hotter than the coating decomposition temperature.

A vacuum atmosphere would accelerate the burnout of a coating material such as polymethyl methacrylate or QPAC-40 (TM), which decomposes by a depolymerization mechanism.

A reducing atmosphere could be appropriate for thicker films of materials such as QPAC-40 (TM). The decomposition of such a material in air is so rapid that the portion of the coating adjacent the part that is being burned off could be damaged, i.e. it could incur blisters or pin holes. The evaporation is milder and more controlled if an inert or a reducing atmosphere is used.

The method of the present invention is especially advantageous when the coupler comprises many fibers. In accordance with previous methods the coatings had to be individually stripped, and the stripped regions had to be aligned within the tube aperture. In accordance with the present method, the coatings are simultaneously removed from all fibers, and the bared regions of all fibers are inherently aligned.

The length of the bared section of fiber is slightly shorter than the length of the capillary tube aperture to allow the coating to extend into both ends thereof, thereby properly positioning the fibers within the aperture cross-section. This protrusion of the fiber coating into the aperture is illustrated in FIG. 4.

In accordance with one embodiment of the present invention, tube 10 is heated and collapsed onto fibers 22 and 24, and thereafter, the midregion of tube 10 is heated and stretched to bring the fiber cores closer together along a distance sufficient to accomplish a predetermined type of coupling.

Figure 5:
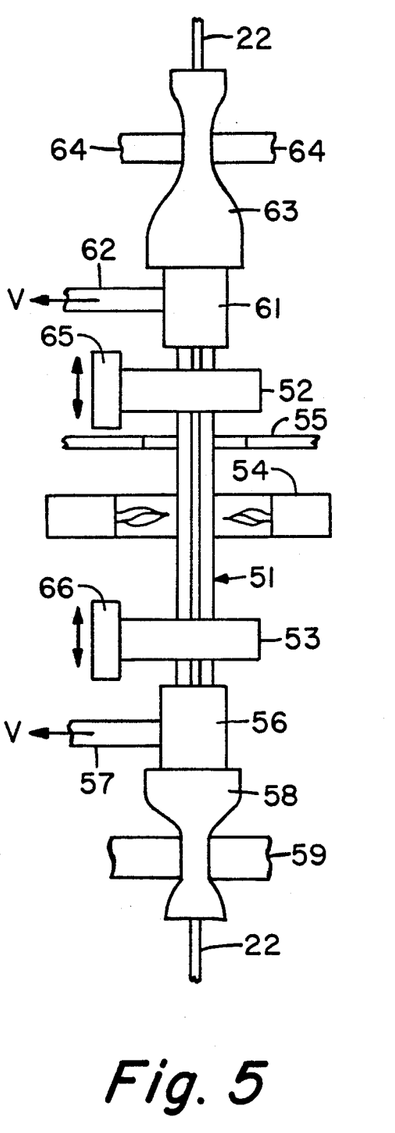
FIG. 5 is a schematic illustration of an apparatus for collapsing the tube and drawing the midregion thereof.

A preferred apparatus for performing the tube collapsing and stretching steps is shown in FIG. 5. Chucks 52 and 53, which are used to secure the coupler preform in this apparatus, are mounted on motor controlled stages 65 and 66, respectively, which are preferably controlled by a computer. Symmetry is an important requirement for the collapse and stretch steps; therefore, chucks 52 and 53 must be aligned to prevent the occurrence in the coupler of an offset which can adversely affect device loss and which can also adversely affect coupler bidirectionality, that characteristic whereby coupler output performance is substantially uniform regardless of which end of a fiber is selected as the input port. Coupler bidirectionality is also enhanced by locating the burner centrally along the coupler preform so that it heats the preform evenly. A symmetrically designed burner such as ring burner 54 is suitable for evenly heating the capillary tube midregion. Heat shield 55 protects the apparatus located above the burner.

Coupler preform 51 of FIG. 4 is inserted through ring burner 54 with the orientation mark facing a predetermined direction, and the preform is clamped to the draw chucks. The previously described vacuum attachment 56 is attached to the bottom of preform 51. A similar vacuum attachment 61, which is attached to the upper end of preform 51, is associated with vacuum line 62, tubing 63 and clamp jaws 64. Fibers 22 and 24 extend from tubings 58 and 63.

The following "air wash" is normally not needed, but it can be employed if preform 51 is stored or otherwise kept in an environment where it could become contaminated by dust or the like. By clamping jaws 59 on tubing 58, vacuum is applied to the lower portion of coupler preform 51; the upper line is vented to air during this time by leaving clamp jaws 64 open. Any loose debris which has accumulated in aperture 12 is thus removed. Jaws 64 are then clamped against tubing 63 to apply vacuum to the upper portion of preform 51.

Figure 6:
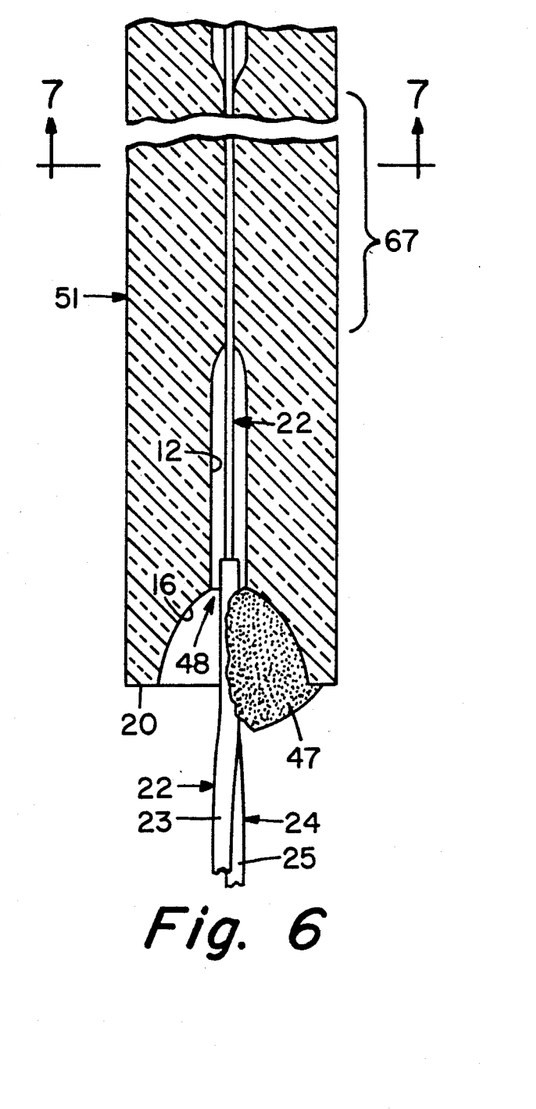
FIG. 6 is a cross-sectional view illustrating the collapse of the glass tube around the fibers to form a solid midregion.
Figure 7:
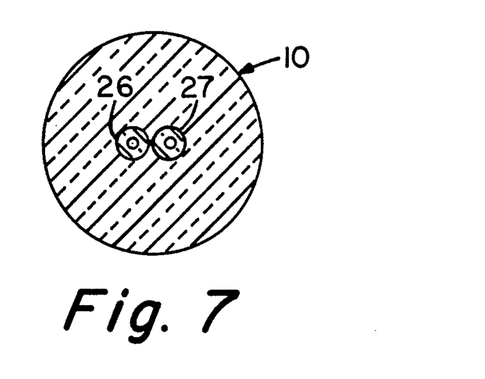
FIG. 7 is a cross-sectional view taken through the solid midregion of FIG. 6 along lines 7—7.

The capillary tube collapse step involves heating the coupler preform with the flame from ring burner 54 for a short period of time, typically about 25 seconds, to increase the temperature of midregion 67 of the tube to the softening temperature thereof. With the assistance of the differential pressure on the tube, the matrix glass collapses onto the fibers 22 and 24 and urges them into mutual contact. The tube matrix glass surrounds the fibers and fills the aperture to form a solid structure as shown in FIGS. 6 and 7. The portion described as midregion 67, which forms the coupling region of the resultant coupler, becomes a solid region that is preferably free of air lines, bubbles, or the like. The longitudinal length of the region that is to be collapsed is determined by the temperature and time duration of the flame, the thermal conductivity of the glass tube, and the amount of vacuum applied. The use of vacuum during collapse causes the tube to collapse before the fibers can soften, thereby preventing or reducing fiber distortion and improving reproducibility. The fibers also tend to remain circular in cross-section when the softening point temperature thereof is greater than that of the tube.

The central portion of the collapsed midregion of the tube can be stretched without removing the device from the apparatus in which the tube was collapsed. After the tube cools, the flame is reignited, and the center of the collapsed region is reheated to the softening point of the materials thereof. The flame duration for the stretch process, which depends upon the desired coupler characteristics, is usually between 10 and 20 seconds. The shorter heating period for the stretch step results in a stretched region that is shorter than the collapsed region. If the entire midregion were stretched, the end portion of the light coupling region of the fibers could be exposed to the aperture. Stretching only the central portion of the collapsed midregion ensures that the coupling region of the fibers will be embedded in the matrix glass of the capillary tube. During this reheating step, the fibers are also heated since they are completely embedded in the matrix glass of the capillary tube and are therefore in thermal contact therewith. After the collapsed tube is reheated, the flame is extinguished and stages 65 and 66 pull in opposite directions until the coupler length has been increased by a predetermined amount. If properly aligned apparatus is employed and if the process parameters are carefully controlled, all couplers formed by the process will possess similar optical characteristics. The diameter of midregion 67 is reduced as illustrated by region 68 of FIG. 8. The diameter of drawn down region 68 depends upon various fiber and operational parameters. The ratio of the drawn down diameter of region 68 to the starting diameter of midregion 67 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about $\frac{1}{2}$ to 1/20; however, couplers can be made having draw down ratios outside this range.

The amount of stretching to which the capillary tube must be subjected to achieve a given type of coupler is initially determined by injecting light energy into one input fiber of a collapsed coupler preform and monitoring the output power at the output fibers during the stretch operation. To accomplish this purpose, one of the fiber pigtails is aligned with a light source, and both pigtails at the other end of the device are coupled to light detectors. The predetermined ratio of the dynamic output powers can be used as an interrupt to cause stages 65 and 66 to stop pulling the sample. After having determined the proper stretching distance to achieve predetermined coupling characteristics, the apparatus can be programmed to move the stages that proper stretching distance during the fabrication of subsequent couplers that are to have said predetermined characteristics.

It is conventional practice to monitor output signals to control process steps in the manufacture of optical devices as evidenced by U.S. Pat. Nos. 4,392,712 and 4,726,643, U.K. patent application No. GB 2,183,866 A and International Publication No. WO 84/04822. Furthermore, computers are often employed to in feedback systems which automatically perform such monitor and control functions. A suitably programmed PDP 11-73 micro-computer can be utilized to perform these functions. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, flow rates of gases, and the rate at which the stages pull and stretch the coupler preform. Reproducibility is also a function of the resolution of stages 65 and 66.

Figure 8:
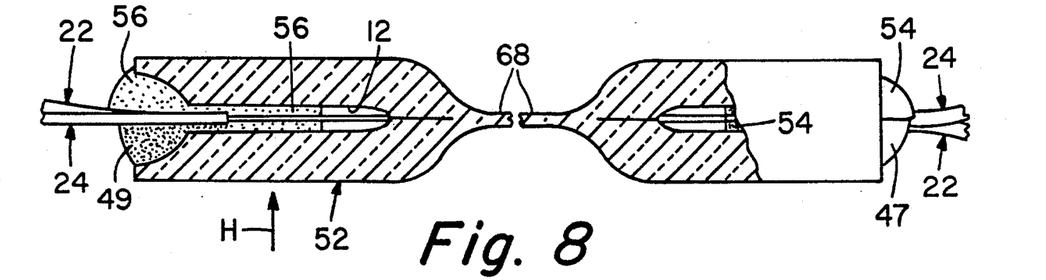
FIG. 8 is a cross-sectional illustration of the fiber coupler of the present invention after it has been drawn down and sealed at its ends.

The vacuum lines are removed from the resultant coupler, and quantities 54 and 56 of glue are applied to the ends of the capillary tube. Arrow H of FIG. 8 illustrates the local application of heat to the uncollapsed regions of the coupler. As the air within the aperture becomes heated, it expands and is driven from the aperture. When the heat source is removed, the glue is drawn into the aperture as the remaining air cools. The glue is then cured. This latter application of glue increases the pull strength of the fiber pigtails and produces a hermetic seal. The resulting assembly comprises fiber optic coupler 52 of FIG. 8 which functions to couple a signal in optical fiber 22 to optical fiber 24 and vice versa. The coupler is then removed from the draw apparatus and can be packaged if additional stiffness is desired.

In accordance with the above-described embodiment, the tube is allowed to cool prior to heating it for the stretching operation in order to provide more control over each step. This enables the stretching of a central portion of the solid collapsed midregion, thereby keeping the stretched portions of the optical fibers completely enclosed in the matrix glass of the tube. This improved hermeticity is advantageous since it prevents the stretched portions of the fibers from being adversely affected by water and other contaminants that can adversely modify the optical characteristics of the coupler.

Low loss couplers have also been made by an alternative embodiment wherein the steps of collapsing the tube onto the fibers and drawing or stretching the midregion of the tube are performed in a single heating operation. In accordance with this modified embodiment, the fibers are inserted into the capillary tube and are glued taut to the ends thereof such that there are access openings to the aperture. This assembly is placed in the apparatus of FIG. 5. A flame is applied to a small portion of the midregion until the softening point of the materials is reached, and the heated section is stretched. For a given amount of coupling, the amount of tube elongation is greater in this embodiment than in that embodiment wherein the tube collapse and the midregion stretching steps are separately performed. Finally, glue is applied to the ends of the device to close the openings to the aperture.

The disadvantages of this modified embodiment are a reduction in hermeticity and an adverse affect on manufacturing reproducibility, i.e. stretching to a predetermined length does not always result in the desired coupling characteristics. However, this embodiment has some advantages over other methods. The method is simpler in that it can be performed without vacuum and the separate tube collapse step is eliminated.

In a further embodiment of the invention, the required length of coating material is initially mechanically stripped from the fibers as described in said copending application Ser. No. 223,423. This method is similar to that described above in connection with FIG. 2 except for the following modifications. The two lengths 22 and 24 of coated optical fiber are wiped clean, and their ends are secured by clamps 30 and 31, respectively. The capillary tube is threaded onto the fibers and moved to a position adjacent block 36. The fibers are pulled slightly, and the remaining ends thereof are then restrained by clamps 44 and 45. A mechanical stripping tool is utilized to remove a portion of the coating from each fiber at a location thereon between tube 10 and block 39. The length of the stripped sections of the two fibers, which are substantially equal, are slightly shorter than the length of the capillary tube aperture. The two fibers are wiped firmly and are placed into grooves 35 and 38. Clamps 44 and 45 are released and then reclamped after the fibers have been retensioned. The capillary tube is moved toward block 39 and positioned such that it is centered over the stripped region. The fibers are then glued to the ends of the capillary tube as described above.

The resultant composite comprising the capillary tube and the fibers glued to the ends thereof is then subjected to the process described in conjunction with FIG. 4. That is, air is caused to flow through the aperture by affixing a vacuum attachment to one end thereof, and a narrow flame is traversed along the surface thereof. Any coating material which had become smeared on the inside of the tube during the fiber insertion step is thus removed by the burning technique described above. The fiber coatings can therefore be of such a diameter that they fit snugly into the tube aperture, thereby precisely aligning the fibers.

Figure 9:
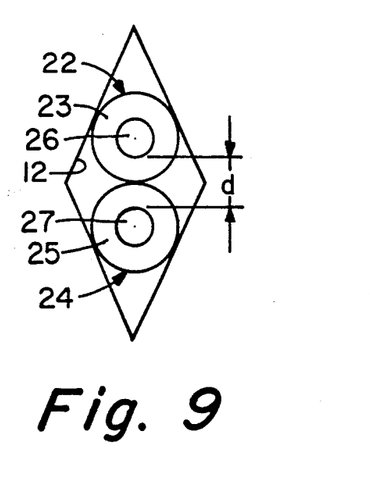
FIGS. 9 and 10 are schematic illustrations of aperture cross-sections having coated fibers disposed therein.

Aperture 12 is schematically illustrated in FIG. 9 in order to describe the sequence of events that is believed to occur during the collapse step. Proper orientation of the two coated fibers 22 and 24 is facilitated by employing a diamond-shaped aperture, since there is insufficient space available in such an aperture for the fibers to be disposed in any orientation except that which is illustrated. This shape is therefore preferred for couplers having two fibers. Similar apertures, including those having the cross-sectional shape of a regular polygon can be used for more than two fibers.

When coatings 23 and 25 fit snugly into aperture 12, glass optical fibers 26 and 27 are separated by a distance d. As the aperture cross-sectional dimensions decrease in size during the tube collapse step, the flattened wall surfaces of the aperture eventually come into contact with the fibers. Further shrinking of the aperture urges the fibers toward each other until mutual contact is achieved. The glass flows around the fibers but not between them. This causes the fibers to remain in mutual contact along the predetermined length of the collapse region. The fibers are also maintained substantially linear in the coupling region, a factor which aids the retention of the polarization of an optical signal coupled by the fiber.

In accordance with a further embodiment of the invention, proper collapse of the tube is facilitated by initially employing a fiber coating that is relatively thin and by employing a capillary tube having an aperture of correspondingly reduced cross-sectional dimensions. During the description of this embodiment, reference will be made to FIG. 10 wherein elements similar to those of FIG. 9 are represented by primed reference numerals. Optical fibers 26' and 27' have the same diameter as optical fibers 26 and 27 of FIG. 9. However, coatings 23' and 25' are thinner than coatings 23 and 25, and aperture 12' is smaller in cross-section than aperture 12. When coatings 23' and 25' are positioned in the illustrated manner in the ends of aperture 12', fibers 26' and 27' are separated by only a distance d' throughout the remainder of the aperture. Since the walls of aperture 12' undergo less inward movement before total collapse is achieved, and since fibers 26' and 27' must be moved a shorter distance to achieve mutual contact, the tube collapse step is more likely to be accomplished without matrix glass from the tube flowing between the fibers.

Figure 10:
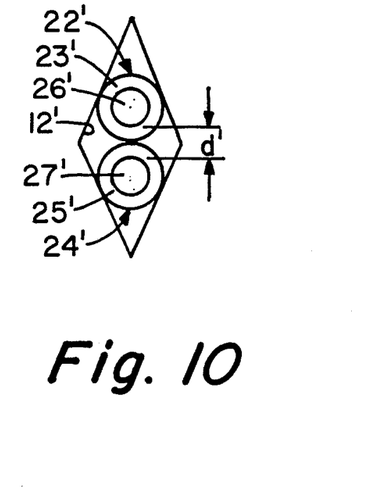

In this embodiment, coatings 23' and 25' must have sufficient thickness to permit fibers 26' and 27' to be temporarily handled during the coupler manufacturing process without breaking. This thickness, which depends upon the coating material, may be as small as 3 μm. After the coupler is made, additional coating material can be added to the pigtails extending therefrom by a suitable technique such as dip coating.

Whereas the preferred embodiment describes the coating burnout step as occurring in a station separate from the collapse and stretch station, the burnout step could also be performed in the collapse station. The composite body shown in FIG. 2 could be mounted in the apparatus shown in FIG. 5. Upper vacuum attachment 61 would not be attached at this time in order to permit air to flow into the upper end of the aperture. Ring burner 54 could be used if the flames therefrom were directed radially inwardly onto a sufficiently short longitudinal region of the capillary tube to precisely control the length of fiber from which coating material is removed. The flows to the burner would be adjusted to provide a decomposition temperature as described above. After burner 54 is ignited, stage 71, which supports the burner, would move downwardly to cause the burner to traverse the tube.

Following are modifications to the above-described tube collapse and draw steps. Midregion 67 could be heated by means of a conventional single-flame burner during the tube collapse and stretch steps, in which case the tube should be rotated with respect to the flame to provide uniform heating. If the collapse and stretch operations are performed in the same apparatus, it is preferred that tube 10 be allowed to cool prior to being reheated for the stretch step. This temporal separation of the two steps results in better process control and therefore better reproducibility. The burner may traverse midregion 67 during the tube collapse step and/or the stretch step, but it is preferred that it remain stationary with respect to the tube during these operations. During the tube collapse step, the vacuum source could be attached to only one tube end, in which case a traversing burner should traverse the tube toward the evacuated end of the tube. During the step of drawing the preform midregion, stage 65 could be moved at a different velocity than stage 66 and in the same direction as stage 66. Furthermore, tube 10 can be disposed in any orientation including vertical and horizontal during the tube collapse and/or drawing operations.

A fiber optic coupler was made in accordance with the following specific example. Glass particulate material was applied to a cylindrical mandrel to form thereon a porous preform, the composition of which was $SiO_2$ doped with 8 wt. % $B_2O_3$. After the mandrel was removed, the porous preform was consolidated and dried to form a tubular glass body which was heated and redrawn to reduce its diameter. The resultant tube was shrunk onto a carbon mandrel of square-shaped cross-section, and the mandrel was then burned out in accordance with the teachings of U.S. Pat. No. 4,750,926. The resultant tube was then drawn to reduce the cross-sectional dimensions of the square-shaped aperture to about 310 μm on a side.

One end of the resultant capillary tube was attached to a source of air pressure, and while the tube was rotated, a flame was directed onto the tube at spaced intervals. The air pressure within the tube caused a bubble to be formed at each region of the tube softened by the flame. The tube was scored at the center of each bubble and then severed at each score line to produce a capillary tube 10 having tapered apertures at each end thereof. The capillary tube had an outside diameter of about 2.8 mm and a length of about 4.12 cm.

Two lengths 22 and 24 of coated single-mode optical fiber were severed from a reel of fiber. The optical fibers had a diameter of 125 μm, and the diameter of the coated fiber was about 175 μm. The length of each piece of fiber was about 2 meters. The ends of the fibers were secured by clamps 30 and 31, and the fibers were wiped with a lintless cloth dampened with ethyl alcohol. The remaining ends of the fibers were threaded into the tube. The minimum cross-sectional dimension of the diamond-shaped aperture was just large enough to accept the coated portions of the optical fibers in the manner illustrated in FIG. 3. A small amount of ethyl alcohol was squirted into the capillary tube to facilitate insertion of the fibers. The fibers were pulled slightly and the remaining ends thereof were clamped. The fibers were placed into grooves 35 and 38; they were then retensioned and restrained by clamps 44 and 45.

Tube 10 was centered between blocks 39 and 36 as shown in FIG. 1 and the fibers were tacked to the ends of the tube as described above using Dymax 911 UV curable adhesive. A small amount of the adhesive was carefully applied to one side of fibers 22 and 24 at each end of the tube to ensure the presence of openings 48 and 50. The adhesive was exposed to a Dymax PC-3 UV light source for thirty seconds at each end of the tube. The fiber pigtails extending from the coupler preform were color coded. At this time the fibers within the capillary tube were visually checked for twists. Also, a beam of HeNe laser light was launched into that end of fiber 22 protruding from clamp 44. The radiation of light from the remaining end of that fiber indicated that no partial twist was present. An orientation mark was placed on the upper surface of tube 10.

The resultant assembly was placed in a V-grooved bracket which securely held the tube in a vertical orientation. Vacuum attachment 56 was attached to the preform ends as shown in FIG. 5. Jaws 59 were clamped on tubing 58 and a vacuum of 30.5 cm (12 inches) of Hg was applied to the lower portion of tube 10 while the upper end of the preform was vented to the atmosphere. A focused flame was directed at the tube at a point approximately 9.5 mm (⅜ inch) from the open end of the tube. The flame was adjusted such that it was hot enough to cause the fiber coating to glow, but it was not sufficiently hot to cause tube 10 to soften or to cause devitrification to form thereon. The flame was moved along the tube so that the coating burned ahead of the hot spot (that point on the tube onto which the flame was focused). The hot spot was moved along the tube at a rate that was sufficiently slow that it was was never directed onto the region overlying the burning coating material. Rather, the hot spot was advanced over that region after the orange glow of the burned coating had subsided. This condition was indicative of the fact that the coating had been entirely burned from the fiber. The coating was burned from the fibers up to a point about 9.5 mm (⅜ inch) from the bottom end 20 of the tube; the flame was then retracted from the tube.

The resultant coupler preform 51 of FIG. 4 was inserted through ring burner 54 (FIG. 5). With the orientation mark facing the operator, the ends of the preform were secured in chucks 52 and 53. Vacuum attachments 56 and 61 were attached to the preform ends. Jaws 59 were clamped on tubing 58 to apply a vacuum to the lower portion of coupler preform 51 while the upper end of the preform was vented. This "air wash" was continued for approximately thirty seconds. Jaws 64 were then clamped against tubing 63 to apply to the upper portion of preform 51 a vacuum that was allowed to stabilize at approximately 53 cm (21 inches) of Hg. The ring burner was turned on for about 25 seconds to increase the temperature of the midregion of the tube to the softening temperature of the borosilicate glass. This caused tube to collapse onto the fibers along a section of the tube about 0.6 cm long. After the coupler preform cooled for about 30 seconds, the flame was reignited, and the collapsed region was reheated for about 16 seconds. Stages 65 and 66 moved in opposite directions to increase the coupler length by about 1.1 cm. All of the process steps performed in the tube collapse step and the stretch step were performed under the control of a PDP 11-73 micro-computer.

After the coupler had cooled, the vacuum lines were removed from the coupler, and a drop of Dymax 304 adhesive was applied to each end of the capillary tube. The end regions of the tube through which the unclosed portions of the aperture extend were heated to drive out air, and the adhesive was drawn into the ends of the aperture when the tube cooled. After the adhesive was exposed to UV light for 30 seconds, the coupler was removed from the draw.

When light at a wavelength of 1300 nm was input to a first optical fiber pigtail at one end of the resultant device, some of the input light was detected at the second end of the first fiber. The fact that a portion of the input light was detected at the second end of the second fiber pigtail is indicative of the fact that the device functions as a coupler. The excess loss of the device was 1 dB.

We claim:

1. A method of making a fiber coupler comprising the steps of
   providing a glass tube having first and second opposite end portions and a midregion, a longitudinal aperture extending from a first end of said tube to a second end thereof,
   disposing within said longitudinal aperture at least two glass optical fibers, each comprising a core, cladding, and protective coating, at least one end of each of said fibers extending beyond the respective end of said tube, thereafter
   removing from those portions of said fibers that are located within said aperture at least a portion of the coating that is disposed thereon, thereafter
   collapsing the midregion of said tube onto said fibers, and
   drawing at least a portion of said midregion.

2. The method of claim 1 wherein the step of removing comprises removing the coating from that portion of each of said fibers that is located within said aperture except for those portions of said coating adjacent the ends of said aperture.

3. The method of claim 2 wherein the step of removing comprises heating said coating to a temperature sufficiently high to cause it to decompose.

4. The method of claim 3 wherein the step of heating comprises directing a source of heat toward the lateral surface of said tube near said first end thereof and traversing said source toward said second end thereof.

5. The method of claim 3 wherein the step of heating comprises inserting said tube into a furnace whereby at least that portion thereof along which said coatings are to be removed is subjected to said sufficiently high temperature.

6. The method of claim 3 wherein the step of removing produces only gaseous components that are removed from said aperture, whereby no coating residue remains in said tube.

7. The method of claim 3 wherein the step of removing is performed in a reducing atmosphere.

8. The method of claim 3 wherein the step of removing is performed in a vacuum.

9. The method of claim 3 wherein the step of removing is performed in an oxygen-containing atmosphere, whereby said coating is oxidized.

10. The method of claim 2 wherein the step of removing comprises heating said coating to a temperature sufficiently high to cause it to depolymerize.

11. The method of claim 1 wherein the steps of collapsing and drawing comprises heating the central portion of said tube to at least the softening point of the material thereof to collapse the central portion of said tube around said fibers, thereby forming a solid midregion, and thereafter heating at least a portion of said solid midregion to at least the softening points of the materials of said glass fibers and said tube and drawing at least a portion of said midregion.

12. A method of making a fiber coupler comprising the steps of
    providing a glass tube having first and second opposite end portions and a midregion, a longitudinal aperture extending from a first end of said tube to a second end thereof,
    providing at least two glass glass optical fibers, each having a core, cladding, and protective coating,
    threading said fibers through said tube aperture, said fibers extending beyond each of said ends of said tube,
    holding said fibers taut to effect a tension in the fibers, thereafter
    removing the coating from that portion of each of said fibers that is located within said aperture except for those portions of said coating adjacent the ends of said aperture,
heating said midregion,
collapsing said midregion onto said fibers, and
drawing at least a portion of said midregion.

13. The method of claim 12 wherein the step of holding said fibers taut comprises securing one end of each of said fibers that extend from the first end of said tube, pulling the remaining ends of said fibers that extend from the second end of said tube to apply a tension to said fibers, and securing said remaining ends of said fibers.

14. The method of claim 13 wherein the step of providing a glass tube comprises providing a tube having enlarged tapered apertures in said end portions for providing access to said longitudinal aperture from the ends of said tube, and wherein the step of holding said fibers taut comprises applying glue to said fibers to secure them to said first end portion of said tube, applying tension to said optical fibers within said longitudinal aperture, and applying glue to said fibers to secure them to said second end portion of said tube, said glue being applied to only one side of said fibers at at least one end of said tube so that said aperture is not blocked, whereby gaseous components resulting from said step of removing can be evacuated from said aperture.

* * * * *